July 16, 1968     J. E. WALDRUM     3,392,884
PLANTER AND CHEMICAL APPLICATOR
Filed Nov. 7, 1966     2 Sheets-Sheet 1

INVENTOR
JOHN E. WALDRUM

BY
Caesar, Rivise, Bernstein and Cohen
ATTORNEYS.

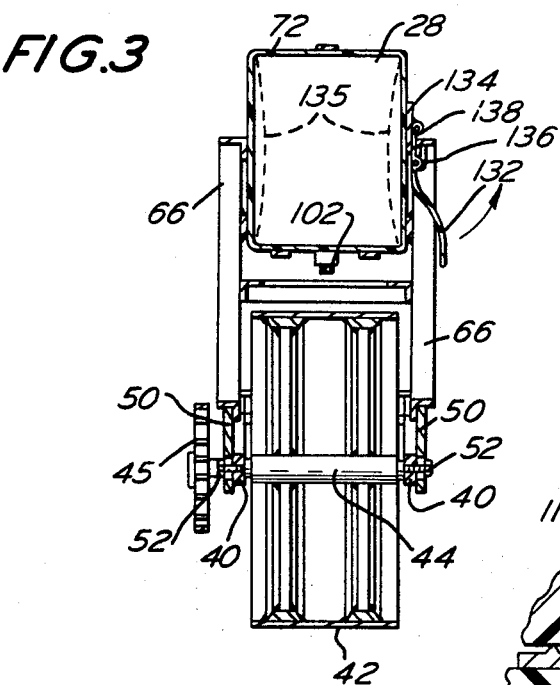
FIG.3
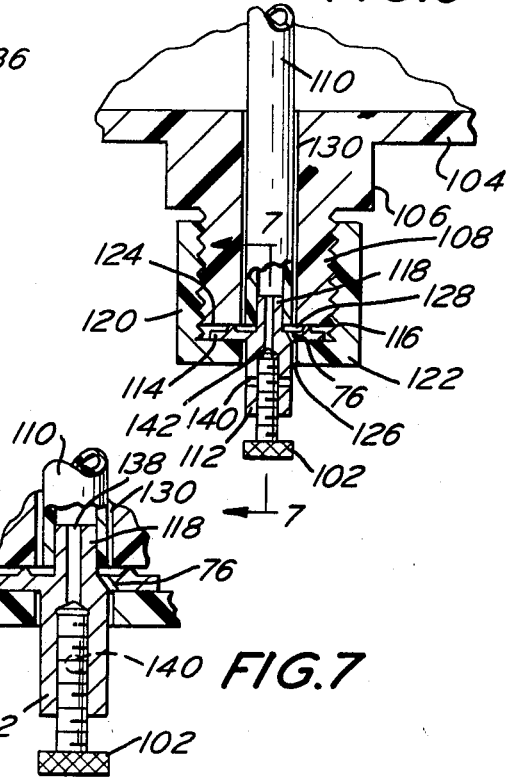
FIG.6
FIG.7
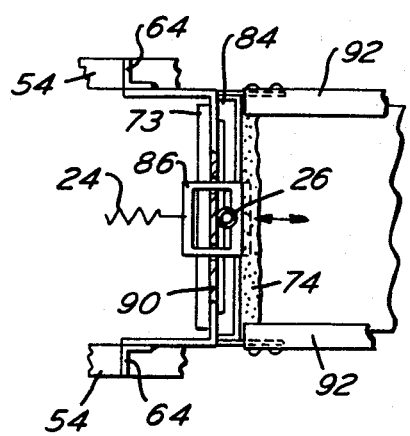
FIG.4
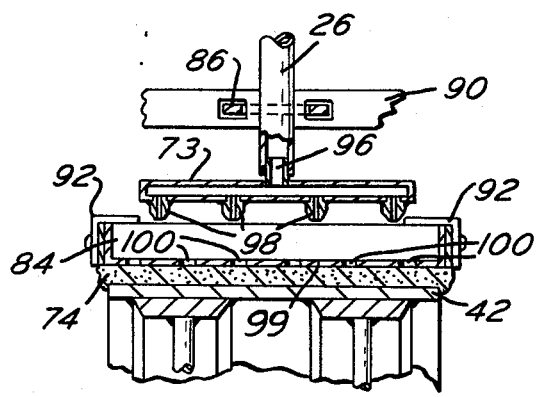
FIG.5
INVENTOR
JOHN E. WALDRUM
BY
Caesar, Rivise, Bernstein and Cohen
ATTORNEYS.

United States Patent Office 3,392,884
Patented July 16, 1968

1

3,392,884
PLANTER AND CHEMICAL APPLICATOR
John E. Waldrum, Ambler, Pa., assignor to Amchem Products, Inc., Ambler, Pa., a corporation of Delaware
Filed Nov. 7, 1966, Ser. No. 592,397
6 Claims. (Cl. 222—177)

ABSTRACT OF THE DISCLOSURE

A planter and chemical applicator including a herbicidal reservoir and dispensing means extending from the reservoir with absorbent means in contact with applicator means, the dispensing means having a flexible hose connecting to the reservoir with herbicide being delivered through a hose, and then to a manifold prior to reaching the absorbent means with a clamp in releasable contact with the hose and an actuating chain connected to the clamp so that the clamp exerts pressure on the hose to prevent herbicide flow when movement of the planter and chemical applicator is halted.

---

This invention relates to a planter and chemical applicator and has as its principal objective the provision in a planter of a liquid herbicide dispensing mechanism, such that the steps of planting and applying herbicide to the soil take place essentially simultaneously in one operation.

Herbicides are generally applied to the soil on either a pre-emergence or a post-emergence basis. The pre-emergence application may be regarded as dispensing the herbicide upon the bare soil, although this term has a somewhat broader definition to include soil with vegetation, but not necessarily the particular weed species against which the herbicide is directed. Where a herbicide can be applied on a pre-emergence basis, it may be effective to prevent the appearance of a weed species altogether or instead may have a stunting effect which is satisfactory in many cases.

The application of a herbicide on a post-emergence basis involves the objective of bringing about actual contact between the herbicide and the weed species to be attacked. However, there are times when the weed species may exhibit a stunting effect upon the economic crop prior to the time the weed species is destroyed. Therefore, it is usually desirable to eradicate the weed species at the earliest possible time. Also, it is generally easier to attack a weed in its early stages of emergence from the ground as distinguished from the time when the weed has become an established plant.

There are certain herbicides which will exhibit both pre-emergence and post-emergence effectiveness. However, mnay herbicides are more effective either as a pre-emergence or post-emergence herbicide but not as both.

Where a herbicide is effective on a pre-emergence basis and the economies of the use of such herbicides are favorable, the employment of such a herbicide may prove to be the most satisfactory choice for a farmer. However, liquid herbicides are usually dispensed in dilute form as by spraying in order to assure adequate and uniform coverage. This in turn necessitates the handling of large volumes of liquid, together with the usual pumping and spraying problems.

The present invention obviates the foregoing problems by providing a mechanism which achieves the dispensing of liquid herbicides in concentrated form essentially to the area to be treated.

Furthermore, the spraying of herbicides is usually a separate operation unto itself, whereas in the present invention the application of the herbicide is done at substantially the same time as the planting.

2

It will be seen that the present invention achieves the foregoing objectives with a relatively simple apparatus of low cost.

Yet another objective of the present invention is to provide a planter and chemical applicator which achieves a uniform application of the herbicides solely by gravity flow.

Still another object of the present invention is to provide a planter and chemical applicator utilizing gravity flow, but achieving a uniform distribution irrespective of the head of liquid held in the chemical applicator.

Still another object of the present invention is to provide a planter and chemical applicator which is achieved by simple modification of the planter structure.

The foregoing as well as other objects of the invention are achieved by providing a planter of conventional design which is modified to carry a reservoir for the herbicide and which includes dispensing means so that the herbicide is discharged onto an applicator that is in actual contact with the packing wheel of the planter such that the concentrated liquid herbicide is delivered into the earth as it is packed above the seeds which have just been dispensed to the ground by the planter. The planter construction is further modified such that when the planter is not moving delivery of the liquid herbicide will be stopped.

In addition to the foregoing, there is provided an air inlet line or breather slot that is spaced slightly above the point of liquid herbicide discharge, such that the sole head or driving force upon the liquid to be discharged is the height of liquid between the air inlet opening and the liquid discharge opening with the effect of all liquid above the breather slot being cancelled out by virtue of the operation of the present invention. Thus, the discharge of the liquid into the applicator area proceeds under gravity flow, but at a constant rate because the discharge rate of the liquid herbicide is independent of the head of liquid in the reservoir.

Other objectives and many of the attendant advantages of this invention will be readily appreciated as the same becomes better understood by reference to the following detailed description when considered in connection with the accompanying drawings wherein:

FIG. 3 is an enlarged sectional view taken along the lines 3—3 of FIG. 1;

FIG. 4 is an enlarged fragmentary sectional view taken along the lines 4—4 of FIG. 2;

FIG. 5 is an enlarged fragmentary sectional view taken along the lines 5—5 of FIG. 2;

FIG. 6 is an enlarged fragmentary sectional view taken along the lines 6—6 of FIG. 2; and FIG. 7 is a sectional view taken along the lines 7—7 of FIG. 6;

Figure 1:
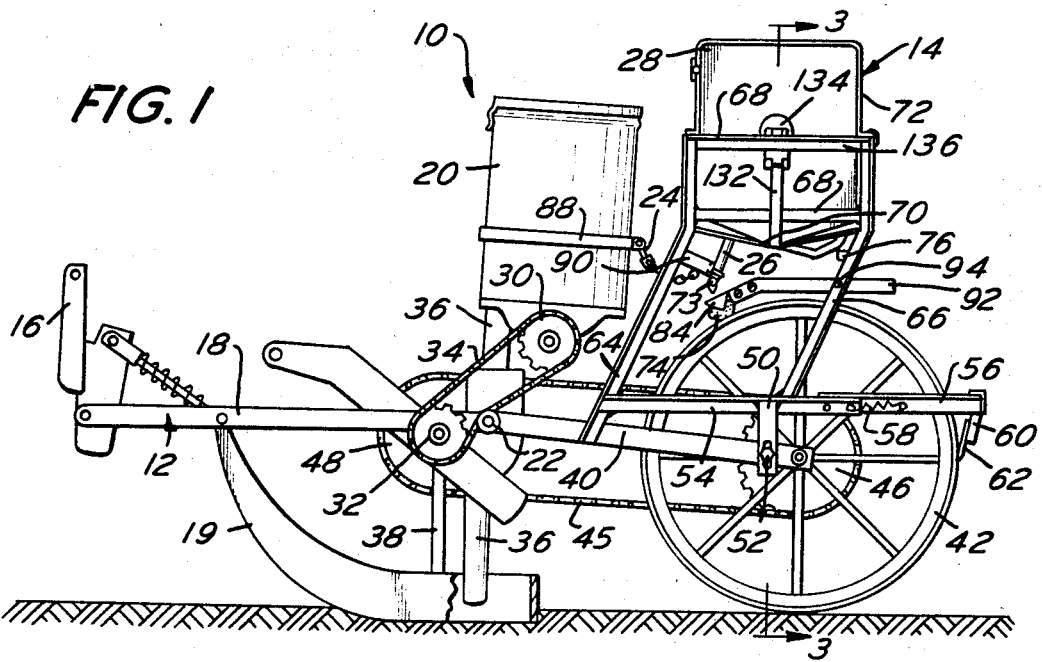
FIG. 1 is an elevational view of the planter and chemical applicator of the present invention.

Referring now in greater detail to the various figures of the drawing wherein like reference characters refer to like parts, there is shown generally at 10 in FIG. 1 a planter and chemical applicator 10 embodying the present invention. The planter and chemical applicator 10 basically consists of planter section 12 and herbicide dispensing section 14 that is supported on the planter section 12.

The planter section 12 comprises standard planter equipment, for example, the well known "John Deere planter" having details of construction which are well known in the art. Therefore, the description of the planter section 12 will be limited to such details as are necessary to a clear understanding of the present invention, although it is to be understood that the herbicide dispensing mechanism of the present invention may be tied in with other types of planters or may even be mounted on its own bed or supporting structure independent of any planter construction.

Figure 2:
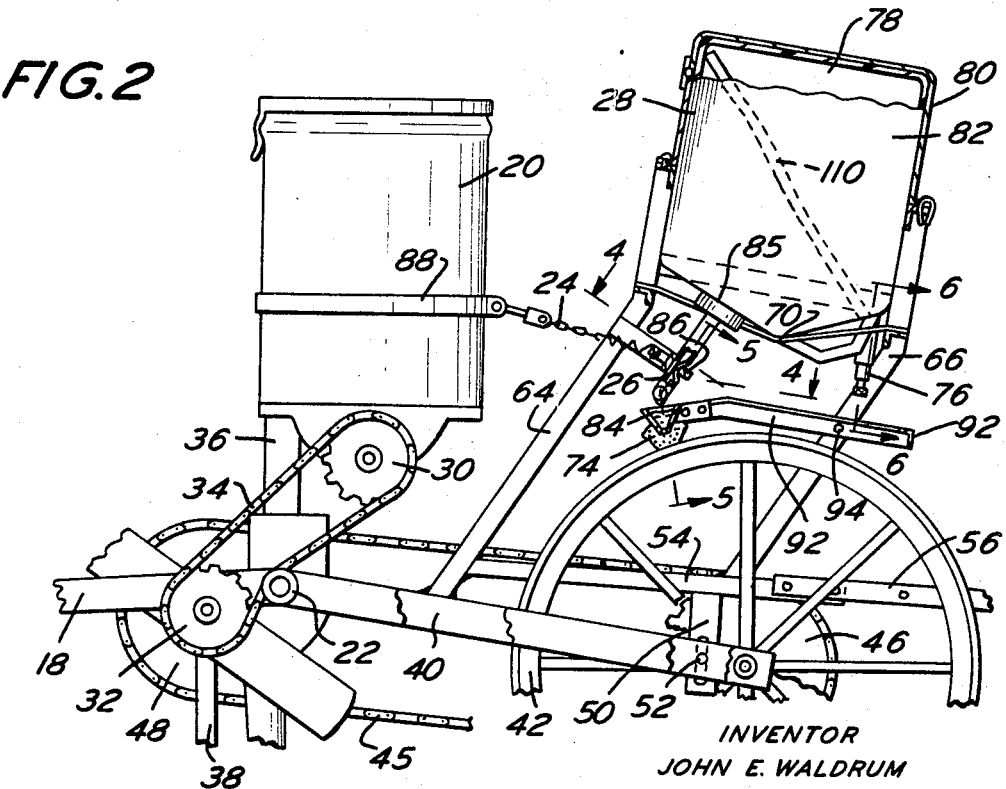
FIG. 2 is a fragmentary enlarged elevational view of the seed tank reservoir and the supports therefor with portions shown in section for the sake of clarity.

The planter and chemical applicator 10 is intended to be pulled by a tractor in a well known manner. It is the practice to secure several planters to a common pull bar which is in turn pulled by a single tractor. With the present invention, concentrated herbicide is applied to the soil in the same operation wherein the planting of seeds is effected. As shown in FIG. 1 the planter section 12 includes a hitching mechanism 16 which extends from draw bar 18, and a shoe 19 is provided for creating a furrow in the ground. A seed tank 20 extends upwardly from the draw bar 18 and is pivoted with respect thereto at pivot point 22. In this manner the entire seed tank 20 is pivoted with respect to the draw bar 18, and it is this pivoting action which permits chain 24 to relax so long as the planter and chemical applicator 10 is being pulled, whereas when motion ceases the chain 24 becomes taut as indicated in FIG. 2. When the chain 24 is taut, hose 26 extending from herbicide reservoir 28 is pinched tight to prevent the discharge of any additional herbicide liquid from the reservoir 28 until movement of the planter begins again.

Other details of the planter section 12 viewable in FIG. 1 include a drive mechanism 30 including sprockets 32 and small chain 34 for staggering the rate of seed distribution from the seed tank 20 through tube 36 and then to be dropped into the furrow created by shoe 19. An upright support 38 is provided for one of the sprockets 32.

The liquid herbicide reservoir 28 is supported upon a pair of rear bars 40 (FIG. 3) which are connected together through the pivot point 22 as for example by a link (not shown) which passes through the pivot point 22 with one end of each of the bars 40 being secured to such link.

Applicator means in the form of wheel 42 with two sets of spokes may take several forms as will be discussed hereinafter. In any event wheel 42 possesses a broad circumferential rim and an axle 44, the ends of which are journalled in suitable bearings positioned in the bars 40. A large chain 45 extends about a sprocket 46 which revolves together with the wheel 44 with such chain also passing about a sprocket 48 which is positioned just forwardly of the seed tank 20. It is seen that as the wheel 42 revolves that the sprocket 46 also turns, and this in turn drives the chain 45 to drive the sprocket 48 which is suitably connected to one of the small sprockets 32 that drive the seed distributing mechanism as was discussed previously.

Extending upwardly from rear bars 40 are adjustable leg pieces 50 which possess a slot that permits the passage of a bolt 52. As shown in FIG. 1 the leg pieces 50 are welded to a horizontal piece 54 which possesses a slidable extension 56 that is connected to the horizontal piece 54 by means of spring 58. The extension 56 includes a downwardly depending block 60 from which extends scraper knife 62 in order to clean the wheel 42 after it has contacted the soil in the process of applying the herbicide to the earth. It can be seen from FIG. 1 that the bar 40 and the horizontal piece 54 provides structural support for a front pair of legs 64 and a rear pair of legs 66 which in turn support the liquid herbicide reservoir 28. Additional support for resrevoir 28 is provided by horizontal members 68 and in addition there is a bottom 70 as well as upper supporting straps 72 that may be removable for purposes of replacement of the liquid herbicide reservoir 28.

From a comparison of FIGS. 1 and 2 it will be seen that when a forward pull is exerted upon the draw bar 18 that the seed tank 20 will be tilted backwardly toward the liquid herbicide 28 and this gives rise to a relaxation of the chain 24. This in turn permits liquid herbicide to flow through flexible hose 26 which is no longer pinched by a clamp as will be discussed hereinafter. When the planter and chemical applicator 10 is halted the seed tank 20 again tilts forwardly and this has the effect of drawing the chain 24 tight as shown in FIG. 2.

The details of the liquid herbicide discharge system including the reservoir 28, the fixed sponge applicator or herbicide absorbing means 74 as well as the constant head feature of the invention will be better understood by reference to FIGS. 3, 4, 5, 6 and 7 in conjunction with certain details of FIGS. 1 and 2 as will be discussed hereinafter.

It is to be noted that the liquid herbicide simply flows from the reservoir 28 under gravity flow. However, the constant head feature of the present invention assures that such gravity flow will be constant even though the head of liquid in the reservoir 28 will gradually decrease as herbicide application proceeds. The maintainence of constant flow is quite important since a heavy flow of herbicide at the beginning of the planter operation would naturally result in either a waste of herbicide at the beginning of planter operation or if the early flow was satisfactory then there would be an inadequate amount of herbicide being employed during the later operation of the planted when most of the liquid herbicide will already have been discharged from the reservoir 28.

The constant head feature of the present invention arises from the fact that the discharge of herbicide occurs from dispensing manifold 73 at a point just slightly below air intake from the breather slot 76. It is thus seen that the atmosphere will press down upon a short column of liquid herbicide having a height equal to the difference in level between the points 73 and 76. In this manner and in view of the maintenance of a partial vacuum in the air space 78 above herbicide liquid level 80 in the reservoir 28, the effect of the head of the liquid herbicide 82 is completely eliminated.

The theory of the constant head feature of the present invention can be understood through the use of two unopened cans of fruit juice or any other liquid, so long as the cans remain unopened before the demonstration starts. The effect of the head of the liquid in the first can can be demonstrated by punching a hole in the top of the can to permit the entrance of air as the liquid is discharged through an opening in the bottom or in the side of the can along the bottom. It will be seen that the liquid will be discharged through the bottom opening in the normal manner such that in the early stages of discharge the stream of liquid will shoot out for a considerable distance and then gradually diminish as the level of liquid in the can becomes less and less.

In the second can a hole is also punched in the bottom or in the side near the bottom of the can. However, instead of punching the second hole in the top of the can, the second hole is punched in the side of the can preferably a short distance above the first hole, for instance, an inch above the first hole. It will be seen that this time the liquid discharge will be constant and this can be observed because the stream of liquid emerging from the bottom opening will extend out for a constant distance until such time as the level of liquid in the can reaches down to the upper opening in the side of the can. It will be further appreciated that the aforesaid constant discharge occurs because the atmospheric pressure acting through the upper opening presses upon a constant short head of liquid extending between the two openings. In other words the atmosphere does not have an opportunity to press upon the entire height of the liquid in the can, and in this way the effect of the varying height of the liquid in the can is completely nullified.

The present invention operates on a similar principle whereby atmospheric pressure may exert its effect through the breather slot or air inlet point 76 with the actual liquid discharge occurring from the manifold 73 (FIG. 7) into the trough 84.

As indicated in FIG. 2 the hose 26 depends from an opening in the reservoir 28 which may be of the usual spout type construction with a reinforcing rim or boss 85 being shown in FIG. 2.

The details of the manifold 73 in its relationship to the trough 84 can be best seen from a consideration of FIGS. 4 and 5 and the details of construction connected with the breather slot 76 can be understood by consideration of FIGS. 6 and 7.

As shown in FIG. 5 the hose 26 is sufficiently flexible that it can be pinched by a clamp 86 to which one end of chain 24 is connected. As shown in FIG. 2 the other end of the chain 24 is connected to the seed tank 20 by attachment to a circumferential strip 88 that extends about the seed tank 20. As further seen in FIG. 4 the clamp 86 is actually mounted in sliding engagement through a support 90 for the clamp. With reference to FIG. 1 the trough 84 is structurally supported by attachment to arms 92 that are pinned at 94 to arms 66. The support 90 is in turn attached to the arms 64, and the support 90 also serves to support sponge 74.

As further shown in FIG. 5 the manifold 73 includes a short run 96 that extends upwardly into the feeder hose 26, and the manifold 73 includes a series of discharge openings 98 whereby liquid herbicide may drop into the trough 84 which has a base 99 having openings 100 therein which permit the liquid herbicide to drain into the sponge 74. As further shown in FIG. 5 the circumferential or ground-engaging area of the wheel 42 moves with respect to and rubs against the fixed sponge 74. In this way the liquid herbicide is transferred to the circumferential surface of the wheel 42 which then continues to move toward the ground and finally makes actual contact with the ground. When such actual contact occurs the liquid herbicide, which is quite concentrated, is applied to the ground as the earth is packed over the newly planted seeds. The wheel 42, of course, continues to rotate and any earth adhering to the circumferential portion is removed by the action of scraper 62. Where desired a wire brush may be provided immediately rearwardly of the wheel 42 in order to remove any adhering earth.

In any event the circumferential portion presented again to the sponge 74 is clean, and this will tend to avoid fouling or collection of earth or soil in the sponge 74.

With reference to FIGS. 6 and 7 the details of the breather slot 76 and knurled screw 102 are shown. It is, of course, necessary to provide atmospheric access so that any liquid discharge through the manifold 73 may be replaced by an equivalent volume of air. This is achieved as shown in FIG. 6 wherein the wall 104 of the reservoir 28 terminates in a collar 106 and a threaded section 108 having a central port that permits the passage of hose 110, the purpose of which will soon be discussed.

The knurled screw 102 includes a body 112 that terminates in a flange 114 through which the breather slot 76 is formed. The flange 114 also includes a sealing rim 116 and an upwardly projecting stem 118. The entire assembly is held together by virtue of a cap 120 that fits about the threaded section 108 with the cap 120 including a bottom section 122 which presses against the flange 114 which in turn presses against the bottom face 124 of the threaded section 108 in order to provide a tight unit.

It is to be noted that an air space 126 is provided through the bottom section 122, with the air space 126 communicating with the breather slot 76 which in turn communicates with an air space 128 existing interiorly of the rim 116. The air space 128 in turn communicates with an air space 130 which exists because the hose 110 is somewhat loosely fit into the central opening in the collar 106. It is thus seen that air may work its way through slot 126 into breather slot 76 and then through air spaces 128 and 130 and finally upwardly to the air space 78 that exists in the reservoir 20.

It therefore follows that as liquid herbicide is discharged through the openings 98 in the manifold 73 that equivalent volumes of air may work their way into the interior of the herbicide liquid reservoir 28 through the breather slot 76. Also the constant head effect of the present invention is achieved by virtue of the atmospheric access through the breather slot 76 which renders the height of liquid existing between the breather slot 76 and the discharge openings 98 in the manifold 73 as being the only driving force upon the gravity flow of the liquid herbicide through the discharge openings 98.

In order for the constant head feature of the present invention either to become operative or to persist, it is desirable that the air space 78 above liquid level 80 be maintained at a pressure slightly less than atmospheric pressure.

In order to do this, a partial vacuum is created in the air space 78 before movement of the planter and chemical applicator 10. The achievement of such a vacuum nullifies any pressure which may have built up in air space 78 during storage of the reservoir 28.

The aforesaid partial vacuum is achieved by operation of press handle 132 which includes a pressure plate 134 that becomes operative against a flexible side of reservoir 28. Of course, if desired the sides of the reservoir 28 may be rigid, and in this case some type of air exhaust or vacuum pump may be instead utilized. The effect of the pressure plate 134 is illustrated in the dashed lines 135 of FIG. 3. It is also to be noted that the press handle 132 is pivoted at 136 to a support plate that is attached to a side wall of the reservoir 28.

As indicated in FIG. 2 when the press handle 132 is operated, the partial collapsing of at least one wall of the reservoir 28 increases the pressure upon whatever air may exist in the air space 78, and this air has a convenient discharge through the hose 110, and then outwardly of the backed-up knurled screw 102 as will now be described. The aforesaid compressed air moves through central port 138 in extension 118 and then is discharged through openings 140 in projection 112 (FIG. 6), and this occurs by backing up the knurled screw 102 in order to permit communication between the central openings 138 and the discharge openings 140. As soon as the air evacuation has occurred, the knurled screw 102 is then tightened to the position of FIG. 6 so that its forward tip is tightly seated in place with the sealing ring 142 thereby preventing the re-entrance of atmospheric air when the walls of the reservoir 28 tend to return to their initial uncollapsed condition. The only way which atmospheric air may now enter the reservoir 28 is to replace any liquid that is discharged through the manifold 73, and the entrance of such air occurs through the breather slot 76 rather than through the openings 140.

It is thus seen that a partial vacuum will always be maintained in the air space 78 throughout the entire operation of the invention since the atmospheric air periodically entering through the breather slot 76 will only compensate for the volume of liquid discharged through the manifold 73, but will not compensate for the air that was evacuated initially through the operation of the hand lever 132. It is considered desirable to maintain a partial vacuum in the air space 78, since if atmospheric pressure or a pressure greater than atmospheric pressure existed in the air space 78, then such pressure would become effective upon the entire height of liquid herbicide in the reservoir 28 and this would possibly adversely affect the consistant head feature of the present invention. With a partial vacuum in the air space 78 the normal effect of the atmospheric pressure is confined to the height of liquid existing between the breather slot 76 and the discharge opening 98 in the manifold 73.

It is thus seen that the present invention provides a convenient planter and chemical applicator whereby herbicide in concentrated form can be applied directly to the ground during the planting process. In this manner concentrated herbicide may be utilized as compared with spraying techniques whereby the dilute herbicide must be applied at rates ranging from twenty to forty gallons per acre. In place of this the present invention applies the concentrated herbicide at a rate of about one gallon per acre. Furthermore, the herbicide application step occurs substantially simultaneously with the planting operation, but with prior practices, it was necessary to follow up the planting operation with a separate spraying operation.

While the circumferential area of wheel 42 has been described as being flat, it is within the contemplation of the present invention that such circumferential area may be concave or convex, serrated or of other varying configuration as will occur to those skilled in the art.

It is also to be understood that the constant head feature of the present invention may have general application far beyond its use in connection with a planter and is not limited to herbicide applications. Instead the constant head feature can be utilized whenever it is desired to achieve gravity flow at a constant rate, as for example, in spraying, filling, etc.

Without further elaboration, the foregoing will so fully illustrate my invention, that others may by applying current or future knowledge, adapt the same for use under various conditions of service.

I claim:

1. A planter and chemical applicator including a herbicide reservoir for delivering liquid herbicide to applicator means for transfer to the soil to be treated, dispensing means extending from said reservoir and terminating in at least one discharge opening, whereby said herbicide is transferred through said dispensing means to be applied to the soil to be treated, said planter and chemical applicator further including absorbent means interposed between said dispensing means and said applicator means whereby said liquid herbicide passes through said discharge opening onto said absorbent means, with said absorbent means also being in contact with said applicator means, said dispensing means including a flexible hose connected into said reservoir with said hose being connected into a manifold whereby said herbicide is delivered through said hose to said manifold and then to said absorbent means, a clamp in releasable contact with said hose and an actuating chain connected to said clamp with said chain being pulled taut to urge said clamp into firm contact with said hose whenever movement of said planter and chemical applicator is halted whereby herbicide discharge through said hose is prevented when movement of said planter and chemical applicator is halted.

2. A planter and chemical applicator including a herbicide reservoir for delivering liquid herbicide to applicator means for transfer to the soil to be treated, dispensing means extending from said reservoir and terminating in at least one discharge opening, whereby said herbicide is transferred through said dispensing means to be applied to the soil to be treated, said herbicide passing in gravity flow from said reservoir and through said discharge opening in said dispensing means, constant head means including a breather slot allowing atmospheric pressure to have access to the interior of said reservoir, said breather slot being spaced slightly above said discharge opening, said reservoir not being completely filled so as to allow the existence of an air space in said reservoir and means to achieve a partial vacuum in said air space with said reservoir being comprised of at least one flexible wall and press handle means adapted to urge said wall inwardly whereby said air space is compressed and adjustable venting means to atmosphere permitting the escape of said compressed air whereby when said venting means are shut and said wall tends to return to its initial outer condition, a partial vacuum will exist in said air space.

3. The invention of claim 2 wherein said venting means are connected to said air space through an interior tube passing from said venting means and through said herbicide into said air space.

4. The invention of claim 3 wherein said reservoir is not completely filled so as to allow the existence of an air space in said reservoir and means to achieve a partial vacuum in said air space.

5. The invention of claim 4 wherein said reservoir is comprised of at least one flexible wall and press handle means adapted to urge said wall inwardly whereby said air space is compressed and adjustable venting means to atmosphere permitting the escape of said compressed air whereby when said venting means are shut and said wall tends to return to its initial outer condition, a partial vacuum will exist in said air space.

6. The invention of claim 4 wherein said venting means are connected to said air space through an interior tube passing from said venting means and through said herbicide into said air space.

References Cited

UNITED STATES PATENTS

| | | | |
|---|---|---|---|
| 1,516,190 | 11/1924 | Holderle et al. | 222—133 |
| 1,557,019 | 10/1925 | Burcham | 222—177 X |
| 3,071,051 | 1/1963 | Martin | 94—50 |
| 3,112,512 | 12/1963 | Arrault | 15—503 |
| 3,230,570 | 1/1966 | Flippen | 15—503 |
| 3,232,006 | 2/1966 | Atherton et al. | 47—1.5 |
| 3,237,811 | 3/1966 | Orendorff | 222—177 |
| 3,257,753 | 6/1966 | Zennie | 47—1.5 |

ROBERT B. REEVES, *Primary Examiner.*

M. HENSON WOOD, JR., *Examiner.*

N. L. STACK, *Assistant Examiner.*